US005535183A

United States Patent [19]

Miura et al.

[11] Patent Number: 5,535,183

[45] Date of Patent: Jul. 9, 1996

[54] OPTICAL DISK REPRODUCING DEVICE AND ITS SEEK OPERATION METHOD

[75] Inventors: Tohru Miura; Mitsumasa Kubo; Akira Mashimo, all of Tokyo, Japan

[73] Assignee: TEAC Corporation, Japan

[21] Appl. No.: 346,002

[22] Filed: Nov. 29, 1994

[30] Foreign Application Priority Data

Aug. 4, 1994 [JP] Japan .................................... 6-183796

[51] Int. Cl.[6] ........................................................ G11B 7/00

[52] U.S. Cl. ................................ 369/32; 369/50; 369/59; 369/44.28

[58] Field of Search ................................ 369/50, 51, 59, 369/47, 48, 32, 64.28, 124, 54; 360/51; 358/342

[56] References Cited

U.S. PATENT DOCUMENTS

| | | | |
|---|---|---|---|
| 4,539,666 | 9/1985 | Wachi | 369/50 |
| 4,672,597 | 6/1987 | Yamazaki | 369/59 |
| 4,885,644 | 12/1989 | Ishii et al. | 369/50 |
| 5,109,369 | 4/1992 | Maeda et al. | 369/50 |
| 5,157,645 | 10/1992 | Takahara et al. | 369/44.28 |

FOREIGN PATENT DOCUMENTS

| | | |
|---|---|---|
| 3-105768 | 5/1991 | Japan . |
| 5-28632 | 2/1993 | Japan . |
| 91/02352 | 2/1991 | WIPO . |

*Primary Examiner*—W. R. Young
*Assistant Examiner*—Thang V. Tran
*Attorney, Agent, or Firm*—Andrus, Sceales, Starke & Sawall

[57] ABSTRACT

An optical disk device generating reproduced data based on a reproduced digital signal which is derived by tracking a track on an optical disk with an optical pickup is shown. A bit-frequency-information generation unit measures a bit frequency of the reproduced digital signal after transition of the optical pickup in a seek operation, and generates measured-bit-frequency information which indicates a measured bit frequency measured thereby. In a bit-frequency setting unit, if there is a difference between the measured bit frequency and a specified bit frequency, the measured-bit-frequency information is corrected so as to adjust the bit frequency of the reproduced digital signal to the specified bit frequency by a given amount of correction, and is produced as setting-bit-frequency information. And a PLL circuit generates a synchronization clock which is phase synchronized to the reproduced digital signal and is used for generation of the reproduced data by means of setting the bit frequency indicated by the setting-bit-frequency information to a free-run frequency of the PLL circuit.

4 Claims, 8 Drawing Sheets

39

OPTICAL DISK REPRODUCING DEVICE AND ITS SEEK OPERATION METHOD

BACKGROUND OF THE INVENTION

1. Field of the Invention

The present invention generally relates to an optical disk reproducing device and its seek operation method, and more particularly, to an optical disk device for reproducing an optical disk of a constant-linear-velocity (CLV) recording system of CD-ROM, etc., and its seek operation method for transiting tracks of the disk by transition of the optical pickup.

2. Description of the Prior Art

In the optical disk which is called CD-ROM, (which will be designated "disk" hereinbelow), a digital signal is generally recorded by a modulation system which is called eight-to-fourteen modulation (EFM), in the same way as a compact disk (CD) for audio devices.

In the CD-ROM, a time length for one bit and one frame, and a recording length on the disk, in an inside tracking part thereof, is the same as that in an outside tracking part of the disk. Therefore, in a conventional CD-ROM reproducing device, a rotation rate of the disk is changed in relation to a position in a radial direction of the disk so that a pickup could scan the disk whereby each scanned position moves at a constant linear velocity.

As mentioned above, in the CD-ROM reproducing device with the CLV system, the rotation rate of the disk needs to be controlled to a proper rotation rate corresponding to the position in the radial direction of the disk. To meet the need, when the optical pickup seeks a target address, the rotation rate of a spindle motor must be changed from the rotation rate for the present address to that for the target address.

FIG. 1 shows time charts for explaining the seek operation in the conventional CD-ROM reproducing device with the CLV system.

In the conventional CD-ROM reproducing device, for accessing any address on the disk to reproduce the data at the address, after the optical pickup is reached near the target track, the rotation rate of the disk is controlled by use of the EFM signal which is read out from the data near the target track. Therefore, for the seek operation for which the optical pickup is transited to access the other track, it takes the transition time of the pickup and the control time of the disk to reach the proper disk rotation rate, and there is thus the problem of a long time required for the seek operation.

An example of the above-mentioned operation is shown as EX. 1 in FIG. 1. At time $t_0$, the pickup starts to transit. At time $t_1$, the pickup stops transiting. After that, the rotation rate of the disk is adjusted to the specified linear velocity by the EFM signal which is read out. From time $t_3$, the data can be reproduced by synchronizing to the EFM signal being read out. Therefore, it takes a long time ($t_1$ to $t_3$) to achieve the proper disk rotation rate, which thus causes the seek time to increase.

Alternatively, systems in which the disk rotation rate is controlled during transition of the pickup, have been proposed. For example, disk rotation rates for positions in the radial direction of the disk can be previously memorized. Thereby, during the seek operation, the disk rotation rate can be controlled to the proper rotation rate for the target track during the transition of the optical pickup. For another example, the disk rotation rate can be speeded up/slow down by the time corresponding to the distance of the pickup transition.

However, for the purpose that the data can be reproduced with synchronization to the EFM signal which has been read out by the optical pickup after the transition of the optical pickup, the disk rotation rate can be adjusted to within a few percent of the proper rotation rate for the target track during the transition, but there is still a problem that the seek time is increased by the adjusting time to exactly achieve the proper rotation rate.

An example of the above-mentioned operation is shown as an EX. 2 in FIG. 1. In this example, the rotation rate is controlled during the pickup transition during the time $t_0$ to $t_1$. However, after the time $t_1$, the disk rotation rate is further controlled to the specified linear velocity by using the EFM signal which has been read out, and at the time $t_2$ the data can be reproduced with synchronization to the EFM signal which has been read out. Therefore, in this operation it takes time $t_1$ to $t_2$ for adjusting the disk rotation rate within a few percent of the proper rotation rate, so that the seek time is increased by that time.

Furthermore, a system in which the disk is controlled with a constant angular velocity (CAV) instead of the CLV is also proposed. However, in this system, the difference of the bit rate between the inside track and the outside track of the disk is 2.5 times at a maximum value, and if the upper limit of the data transmission speed is equivalent to that of the CLV system, there is a problem that the average of the data transmission speed is decreased.

SUMMARY OF THE INVENTION

It is an object of this invention to provide an optical disk device which is capable of reducing the seek time in the seek operation without degradation of the data transmission speed, in which the disadvantages described above are eliminated.

The object described above is achieved by an optical disk device according to the present invention, wherein the optical disk device generates reproduced data based on a reproduced digital signal which is derived by tracking a track on an optical disk with an optical pickup, the device comprises bit-frequency information generation means for measuring a bit frequency of the reproduced digital signal after transition of the optical pickup in a seek operation, and for generating measured-bit-frequency information which indicates a measured bit frequency measured thereby, bit-frequency setting means for correcting, if there is a difference between the measured bit frequency and a specified bit frequency, the measured-bit-frequency information so as to adjust the bit frequency of the reproduced digital signal to the specified bit frequency by a given amount of correction, and for producing a corrected measured bit frequency as setting-bit-frequency information, and a PLL circuit for generating a synchronization clock which is phase synchronized to the reproduced digital signal and is used for generation of the reproduced data by means of setting the bit frequency indicated by the setting-bit-frequency information to a free-run frequency of the PLL circuit.

The object described above is also achieved by the above optical disk device further comprising disk driving means for rotating the optical disk based on a rotation control signal, speed-up/slow-down signal generation means for generating a speed-up/slow-down signal which is supplied to the disk driving means during transition of the optical pickup in the seek operation and is used to adjust a rotation rate of the optical disk to a target rotation rate, reference-clock generation means for generating a reference clock, a frequency of which is in proportion to the bit frequency indicated by the setting-bit-frequency information, in which the reference clock is used for reproducing the data from the reproduced digital signal, and linear-velocity control means for supplying a result of comparison of the synchronization clock with the reference clock as a linear-velocity control signal to the disk drive means instead of the speed-up/slow-down signal, in which the linear-velocity control signal controls the rotation rate of the disk to keep a linear velocity defined by the reference clock.

The object described above is further achieved by the optical disk reproducing device, wherein the bit-frequency setting means generates the setting-bit-frequency information by means of correcting the setting-bit-frequency information by a given amount of correction, which is determined by taking account of a tracking time of the rotation rate of the optical disk, and also is determined so that the PLL circuit will not be out of synchronization with the reproduced digital signal, and so that the linear-velocity control means will generate the linear-velocity control signal compared with the synchronization clock.

According to the optical disk device, during the transition of the optical pickup the rotation rate of the optical disk is adjusted to the target rotation rate by the speed-up/slow-down signal, and after the adjustment of the rotation rate by the speed-up/slow-down signal the measured bit frequency of the reproduced digital signal is set to the free-run frequency of the PLL circuit, so that the PLL circuit can be synchronized to the reproduced digital signal in a extremely short time. And the reference clock for reading out the data and determining the reference linear velocity can be generated in an extremely short time based on the measured bit frequency information. The above makes it possible to reproduce the data in an extremely short time after the transition of the optical pickup, so that the seek operation time is reduced compared to the conventional device.

Since the data is reproduced with the constant linear velocity, it is possible to get the same data transmission rate as that of the conventional reproducing device with the CLV system.

Furthermore, based on the measured-bit-frequency information and the specified-bit-frequency information, the free-run frequency of the PLL circuit and the frequency of the reference clock are corrected, so that these corrections enable the linear velocity of the disk to be corrected to the specified linear velocity, and thus the data transmission rate can be adjusted to the specified data transmission rate.

In addition, without extending the acquisition frequency range of the PLL circuit, and without extending the phase error range for the operation of the linear-velocity control means, it is possible to normally correct the linear velocity of the optical disk to the specified linear velocity.

Other objects and further features of the present invention will be apparent from the following detailed description when read in conjunction with the accompanying drawings.

DESCRIPTION OF THE PREFERRED EMBODIMENTS

Figure 1:
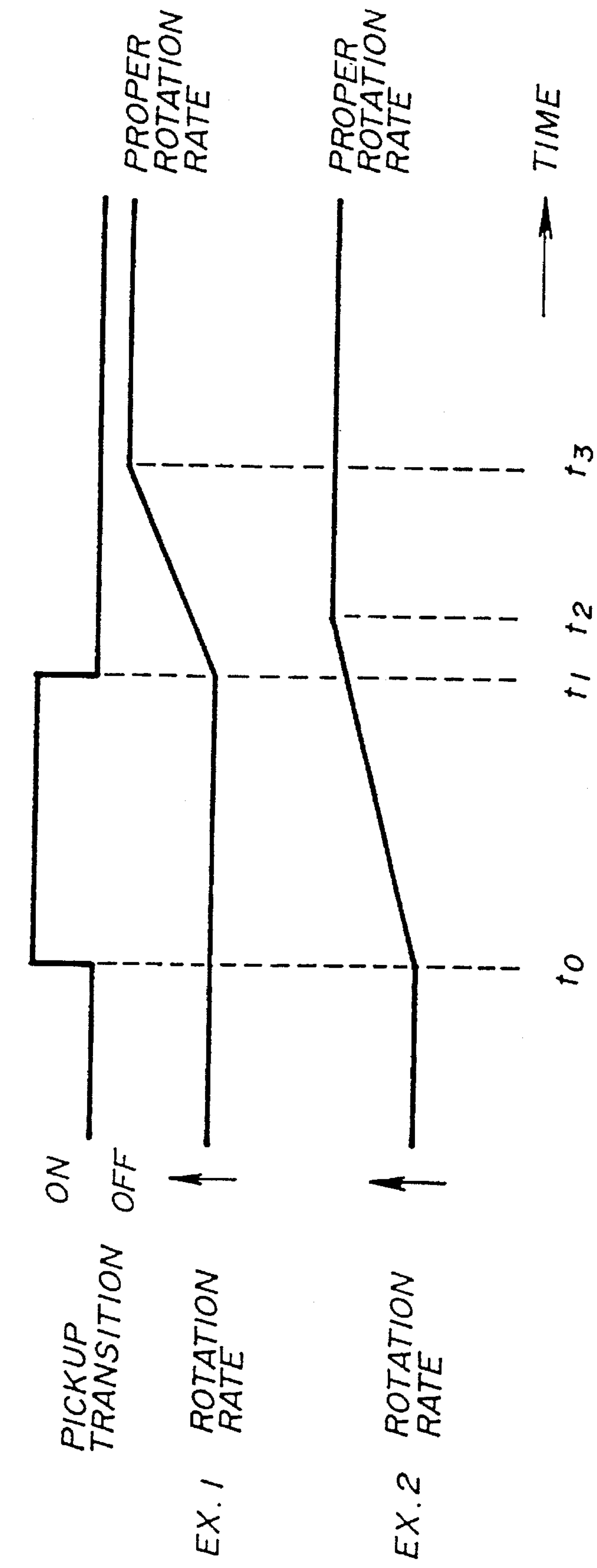
FIG. 1 shows time charts for explaining a seek operation of a conventional CLV type CD-ROM reproducing device.
Figure 2:
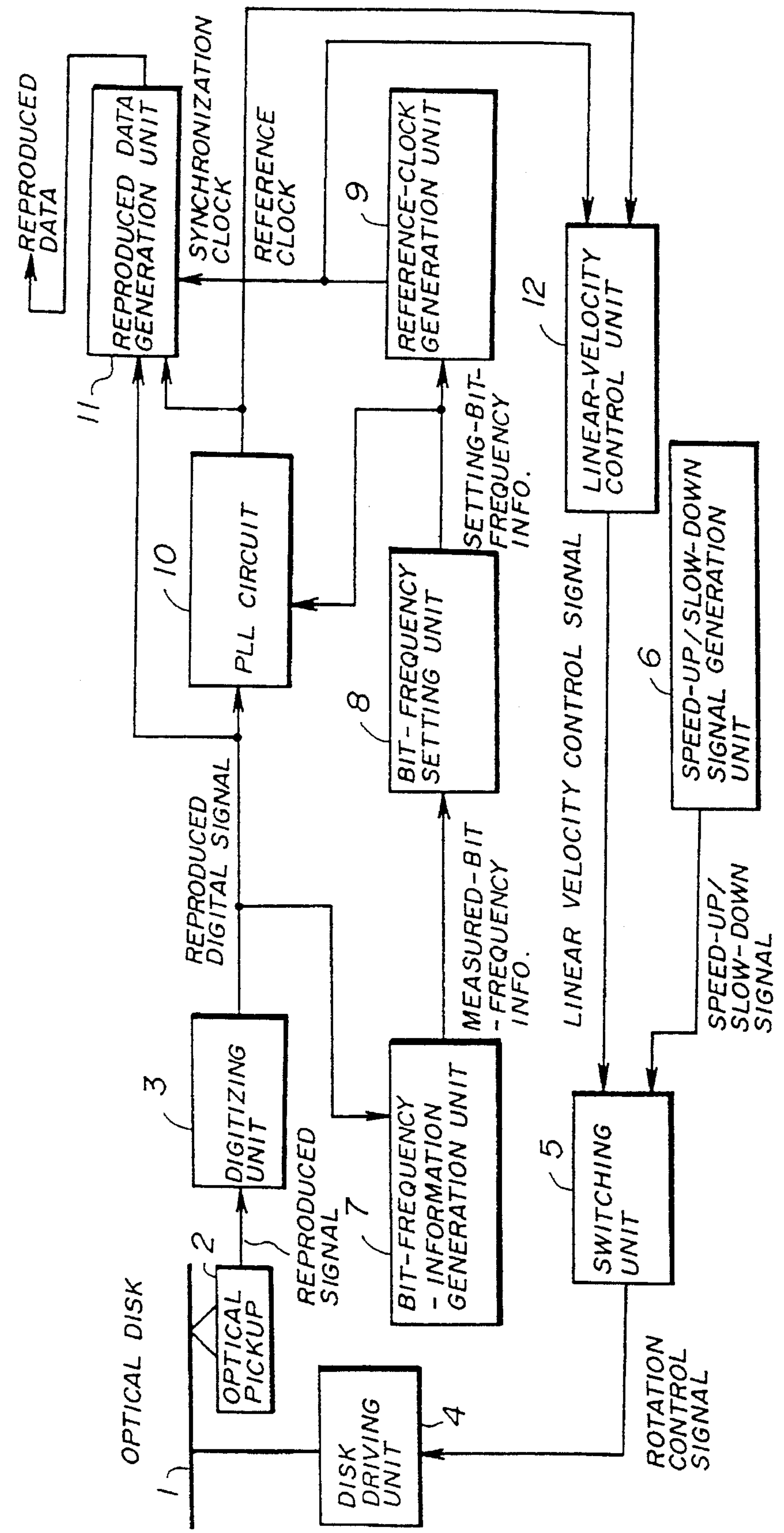
FIG. 2 shows a block diagram for explaining a principle of the configuration according to the present invention.

First, a description will be given of the principle of an optical disk device according to the present invention, by referring to FIG. 2. FIG. 2 shows a basic configuration of the optical disk device. In this device, from an optical disk 1 in which digital signals including clock information are recorded with a constant recording density, a reproduced signal is generated by an optical pickup 2. A digitizing unit 3 generates a digitized reproduced signal.

A disk driving unit 4 rotates the optical disk based on a rotation control signal.

A speed-up/slow-down signal generation unit 6 generates a speed-up/slow-down signal which is supplied to the disk driving unit 4 during transition of the optical pickup in a seek operation and is used to adjust a rotation rate of the optical disk 1 to a target rotation rate.

A bit-frequency-information generation unit 7 measures a bit frequency of the reproduced digital signal, and generates measured-bit-frequency information which indicates a measured bit frequency, just after the adjustment by the speed-up/slow-down signal.

In a bit-frequency setting unit 8, if there is a difference between the measured bit frequency and a specified bit frequency, the measured-bit-frequency information is corrected so as to adjust the bit frequency of the reproduced digital signal to the specified bit frequency by a given amount of correction, and is produced as setting-bit-frequency information indicating a correcting bit frequency. In the difference between the measured bit frequency and the specified bit frequency is less than a given value, the bit-frequency setting unit 8 directly produces the measured-bit-frequency information supplied from the bit-frequency-information generation unit 7.

A PLL circuit 10 generates in a short time a synchronization clock which is phase synchronized to the reproduced digital signal by means of setting the bit frequency indicated by the setting-bit-frequency information to a free-run frequency of the PLL circuit.

A reference-clock generation unit 9 generates a reference clock, a frequency of which is in proportion to the bit frequency indicated by the setting-bit-frequency information. The reference clock is used for reproducing the data from the reproduced digital signal.

A linear-velocity control unit 12 supplies a result of comparison of the synchronization clock with the reference clock as a linear-velocity control signal to the disk drive unit instead of the speed-up/slow-down signal, in which the linear-velocity control signal controls the rotation rate of the disk to keep a linear velocity defined by the reference clock.

A switching unit 5 selects the speed-up/slow-down signal during transition of the optical pickup in the seek operation, and selects the linear-velocity control signal while data is being reproduced. The switching unit 5 produces the selected signal as a rotation-rate control signal.

Reproduced data generation unit 11 generates the reproduced data from the reproduced digital signal by using the synchronization signal and the reference clock.

In this configuration, the seek operation, in which the optical pickup transits the track of the disk is shown as follows:

(a) the optical pickup 2 is moved to the target track, and during transition of the optical pickup 2 in the seek operation, a speed-up/slow-down signal is supplied to the disk driving unit 4 to adjust a rotation rate of the disk 1 to a target rotation rate, (b) a bit frequency of a reproduced digital signal which is reproduced from the disk 1 with the optical pickup 2 is measured just after the adjustment of the rotation rate by the speed-up/slow-down signal, (c) the measured bit frequency is set to a free-run frequency of the PLL circuit 10 through the bit-frequency setting unit 8, and a synchronization clock which is synchronized to the reproduced digital signal based on the free-run frequency is generated in a short time in the PLL circuit 10, (d) the measured bit frequency is supplied to the reference-clock generation unit 9, and a reference clock which is used to reproduce the data from the reproduced digital signal is generated, (e) a result of comparison of the synchronization clock with the reference clock as a linear-velocity control signal is supplied to the disk driving unit 4 instead of the speed-up/slow-down signal just after the synchronization of the PLL circuit 10, and the rotation rate of the disk 1 is controlled to keep a linear velocity defined by the reference clock, (f) the data is reproduced based on the reference clock in the reproduced data generation unit 11, (g) correcting the measured bit frequency by a given amount of correction in the bit-frequency setting unit 8 so as to adjust the bit frequency of the reproduced digital signal to a specified bit frequency if there is a difference between the measured bit frequency and the specified bit frequency, and producing the corrected measured bit frequency as a setting bit frequency indicating correcting bit frequency, and (h) correcting the free-run frequency of the PLL circuit 10 and the reference clock of the reference-clock generation unit 9 according to the setting bit frequency, wherein the step (g) and the step (h) are repeated until the difference between the setting bit frequency and the specified bit frequency is less than a given value.

The above-mentioned procedures enable fast synchronization of the PLL circuit 10, and thus it is possible to reproduce the data in an extremely short time.

Particularly, when there is a difference between the bit frequency just after the transition of the pickup and a specified bit frequency, the above additional procedures ((g) and (h)) make it possible to correct the difference.

In these operations, the bit-frequency setting unit 8 generates the setting-bit-frequency information by means of correcting the setting-bit-frequency information by a given amount of correction, which is determined by taking account of a tracking time of the rotation rate of the optical disk, and also is determined so that the PLL circuit 10 will not be out of synchronization with the reproduced digital signal, and so that the linear-velocity control unit 12 will generate the linear-velocity control signal compared with the synchronization clock.

Figure 3:
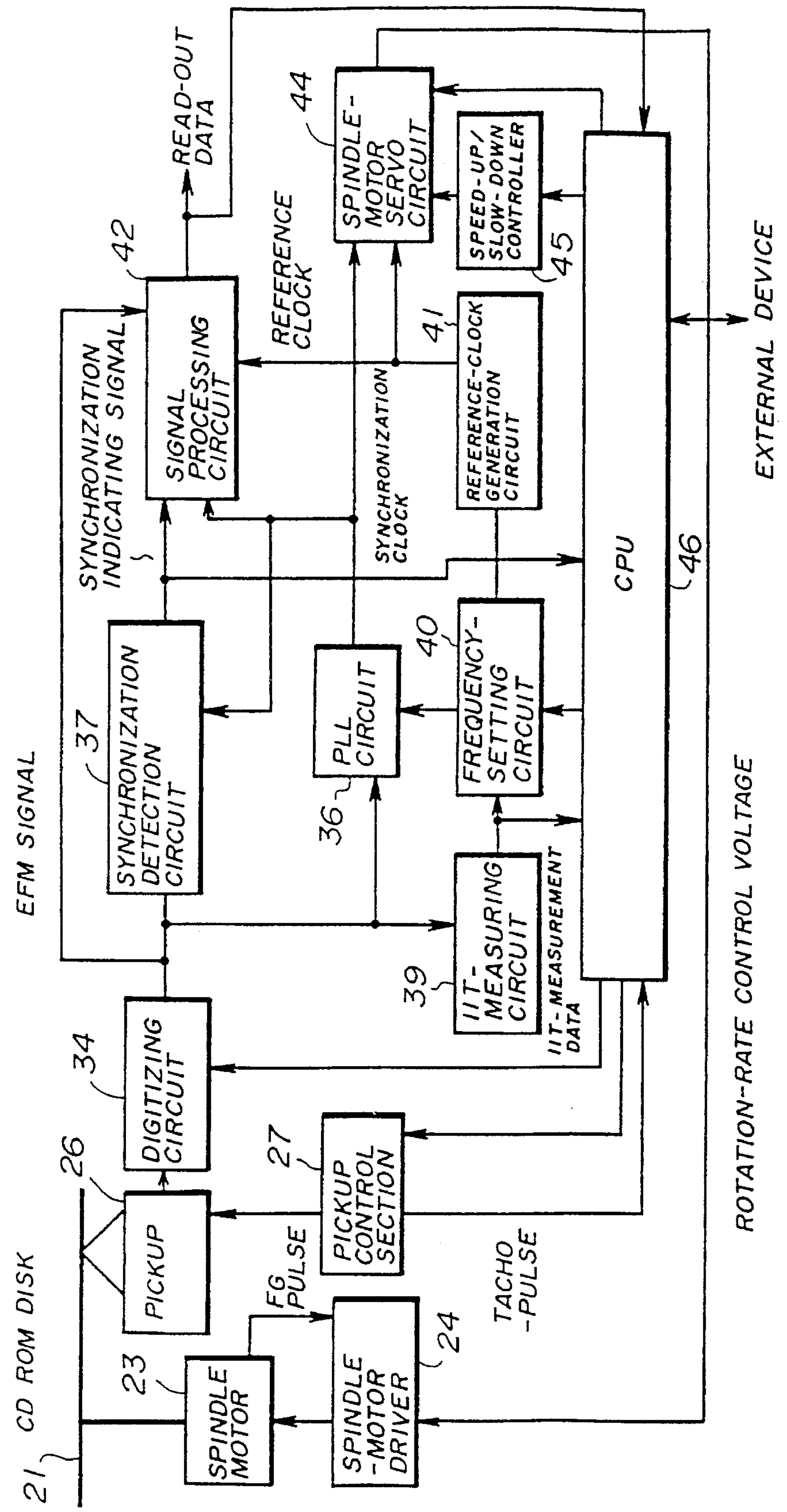
FIG. 3 is a block diagram showing a configuration of the CD-ROM reproducing device of a first embodiment according to the present invention.

Next, a description will be given of a first embodiment of a CD-ROM reproducing device according to the present invention, by referring to FIG. 3. FIG. 3 shows a configuration of the CD-ROM reproducing device. In the CD-ROM disk 21 (which is designated "disk" hereinbelow), digital signals are recorded by an EFM system with a constant bit density over the whole area. Therefore, by using the CLV, the digital signals may be reproduced with a constant bit rate.

A disk driving unit consists of a spindle motor 23 and a spindle-motor driver 24.

The optical disk 21 is rotated by the spindle motor 23. The spindle motor 23 includes an FG-pulse generator, in which FG pulses are applied to the spindle-motor driver-24.

The spindle-motor driver 24 controls a rotation rate of the spindle motor 23 according to a rotation-rate control voltage (rotation-rate control signal) which is supplied from a spindle-motor servo circuit 44. When the spindle-motor servo circuit 44 produces a rotation-rate control voltage of 0 V, the rotation rate of the spindle motor 23 is maintained at a constant rotation rate just before the voltage change to the 0 V. This constant rotation rate is maintained by frequency comparison and phase comparison between a reference signal obtained by dividing a system clock and the FG pulse.

In a pickup control section 27, a focus control and a tracking control of a pickup 26 (an optical pickup), and a seek control which moves the pickup 26 in a radial direction of the disk 21, are carried out in response to commands of a central processing unit (CPU) 46. The pickup control section 27 further produces a tacho-pulse in relation to a distance which the pickup 26 moves in the radial direction of the disk 21.

By the pickup control section 27, for normal reproduction of the digital signal, the pickup 26 is controlled to move along a track on the disk 21, and for the seek operation, the pickup 26 is controlled to transit to a target track.

The CPU 46 is capable of recognizing the distance which the pickup 26 has transited, by detecting the tacho-pulse. Therefore, for the seek operation, the CPU controls the pickup 26 to transit until the CPU may detect the distance from the present track to the target track by the tacho-pulse.

In another system, it is also possible to detect the transition distance of the pickup 26 by a tracking error signal instead of the tacho-pulse.

The pickup 26 applies a laser beam to the target track of the disk 21, and reads out the signal recorded on the disk 21 by detecting a reflection of the laser beam.

In a digitizing circuit 34 (digitizing unit), the read-out signal produced in the pickup 26 is amplified and digitally wave-reformed to supply an EFM signal as a reproduced digital signal. Activation of the digitizing circuit 34 is controlled by the CPU 46, such that after the pickup 26 reproduces the signal by tracking and focusing, the digitizing circuit 34 is activated.

A PLL circuit 36 produces a synchronization clock which is phase-locked to the EFM signal supplied from the digitizing circuit 34. The synchronization clock is a bit clock of the EFM signal.

The PLL circuit comprises a voltage-controlled oscillator (VCO), a phase comparator which compares the EFM signal and a VCO clock, a low-pass filter coupled to the comparator, and an amplifier which amplifies a phase-error voltage from the low-pass filter and supplies it to the VCO, etc.

The free-run frequency of the VCO is set by free-run-frequency control data generated in a frequency-setting circuit 40. And in the VCO, the VCO clocks which is frequency-controlled based on the phase-error voltage, is generated.

In the PLL circuit 36, the VCO clock is produced as the synchronization clock. When the free-run frequency of the VCO is set within a frequency-acquisition range to the bit-frequency of the EFM signal, the synchronization clock, which is properly synchronized to the EFM signal, may be supplied.

A synchronization detection circuit 37 determines synchronization between the synchronization clock and the EFM clock and produces a synchronization indicating signal which indicates whether the state is synchronous or asynchronous. In further detail, a frame-synchronization pattern consisting of a pulse pattern "11T/11T/2T" (T is a bit period), is detected from the EFM signal, and the synchronization between the synchronization clock and the frame-synchronization pattern is measured to produce the synchronization indicating signal.

In the CD-ROM reproducing device according to this embodiment, reproduction of the data is carried out with a constant linear velocity defined by the specification over the whole disk area except a short time after the seek operation.

An 11T measuring circuit 39 (bit-frequency-information generation unit) detects an 11T pulse, which is the longest pulse in the EFM signal, and measures the period of the 11T pulse by using a fast system clock. The 11T-measurement data as an output of the lit measuring circuit 39 is supplied to the frequency-setting circuit 40 and the CPU 46.

Figure 4:
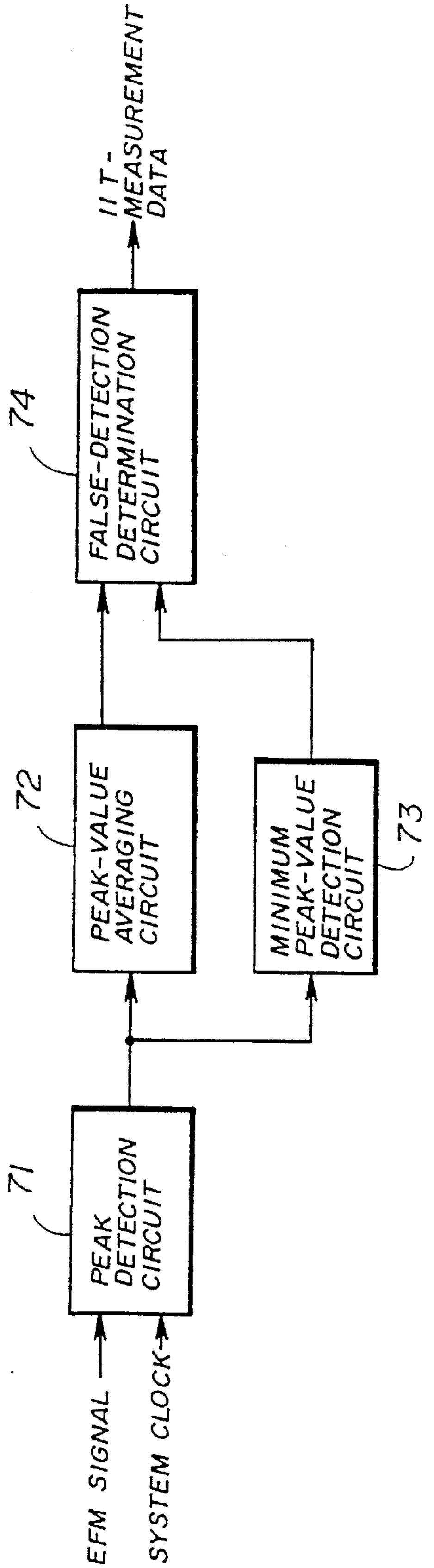
FIG. 4 is a block diagram showing a configuration of an 11T-measuring circuit of the first embodiment.

FIG. 4 shows a block diagram of the configuration of the 11T measuring circuit 39. In a peak detection circuit 71, the synchronization pattern

11T, which is the longest pulse in the EFM signal, is detected in a detection period longer than 1 frame of the EFM signal, and the period of the 11T pulse is counted by the system clock having a constant frequency to produce counted data as peak value data.

However, the peak value data generated in the peak detection circuit 71 may not be the data which indicates the period of the lit pulse depending on environments, such as dropout, etc. Therefore, by means of a peak-value averaging circuit 72, a minimum peak-value detection circuit 73, and a false-detection determination circuit 74, only the proper peak value data (11T measurement data) may be produced.

In the peak-value averaging circuit 72, given samples of the peak value data from the peak detection circuit 71 are averaged to produce average data. In the minimum peak-value detection circuit 73, the minimum data in the same samples as that for averaging the peak value data in the peak-value averaging circuit 72, is detected. This average data and the minimum data are applied to the false-detection determination circuit 74.

In the false-detection determination circuit 74, the average data is compared with the minimum data. In this comparison, if the difference between the data is equal to or less than a reference value output data is determined as proper data, while if the difference is more than the reference value, the output data is determined as inadequate data. For determination of the proper data, the average data is produced as the proper 11T-measurement data.

Furthermore, if a maximum peak-value detection circuit which may detect the maximum data is installed, it is possible to determine whether data is proper or not by comparing the average data, the minimum data and the maximum data.

The 11T-measurement data is in inverse proportion to the linear velocity of the scan area of the pickup 26 of the disk 26, and thus is in inverse proportion to the bit-frequency of the EFM signal.

This 11T-measurement data from the 11T measuring circuit 39 is applied to the frequency-setting circuit 40. In the frequency setting circuit 40, the bit frequency of the EFM signal is derived from the 11T-measurement data and is produced as a setting bit frequency, which is supplied to the PLL circuit 36. The setting bit frequency is set to a free-run frequency of the PLL circuit 36. At that time, in the frequency-setting circuit 40, reference clock control data which indicates the frequency of the reference clock for reading out, is also produced, and is supplied to a reference-clock generation circuit 41. A frequency which is indicated by the reference-clock control data is in proportion to the setting bit frequency.

The frequency-setting circuit 40 and the CPU 46 construct the bit-frequency setting unit. When the frequency-setting circuit 40 accepts a frequency-correction command from the CPU 46, the frequency-setting circuit 40 corrects the setting bit frequency 10 by a given frequency according to the 11T-measurement data. Further, in the frequency-setting circuit 40, the free-run frequency control data which indicates the corrected setting-bit frequency is generated, and the reference-clock control data which is supplied to the reference-clock generation circuit 41 is also generated in proportion to the corrected setting-bit frequency.

The reference-clock generation circuit 41 (reference-clock generation unit) generates the reference clock at the frequency which is indicated by the reference-clock control data, and supplies the reference clock to a signal processing circuit 42 and the spindle-motor servo circuit 44. In the signal processing circuit 42, the reference clock is used to read out the data which has been demodulated. In the spindle-motor servo circuit 44, the reference clock is utilized as a reference to control the rotation rate of the spindle motor 23.

The signal processing circuit 42 (reproduced data generation unit) accepts the EFM signal from the digitizing circuit 34, the synchronization clock from the PLL circuit 36, the synchronization indicating signal from the synchronization detection circuit 37, and the reference clock from the reference-clock generation circuit 41.

In the signal processing circuit 42, when the PLL circuit 36 is synchronized to the EFM signal, the demodulation of the EFM signal is processed by using the synchronization clock. By the demodulation processing, the EFM signal, which is constructed with data consisting of 14 bits,is transferred to data consisting of 8 bits, and is stored in a buffer RAM inside the signal processing circuit 42. After the 10 demodulation, the demodulated data which has been stored in the buffer RAM, is read out as read-out data by using the reference clock. The read-out data is sent to an external device.

The spindle-motor servo circuit 44 accepts the synchronization clock and the reference clock. Furthermore, speed-up/slow-down control data from the CPU 46 is supplied to a speed-up/slow-down controller 45, and is transferred to a speed-up/slow-down control voltage which is applied to the spindle-motor servo circuit 44.

In the spindle-motor servo circuit 44, for the reproducing operation, the synchronization clock and the reference clock are respectively divided into clocks having an almost the same frequency, the phases of which are compared with each other. As a result of the phase comparison, a CLV control voltage is generated to perform CLV control, and is produced as the rotation-rate control voltage. On the other hand, for the seek operation, the speed-up/slow-down control voltage which is supplied from the speed-up/slow-down controller 44, is produced as the rotation-rate control voltage. The CLV control in the reproducing operation and the speed-up/slow-down control in the seek operation are changeably switched by the CPU 46. This rotation-rate control voltage is applied to the spindle-motor driver 24.

Figure 5:
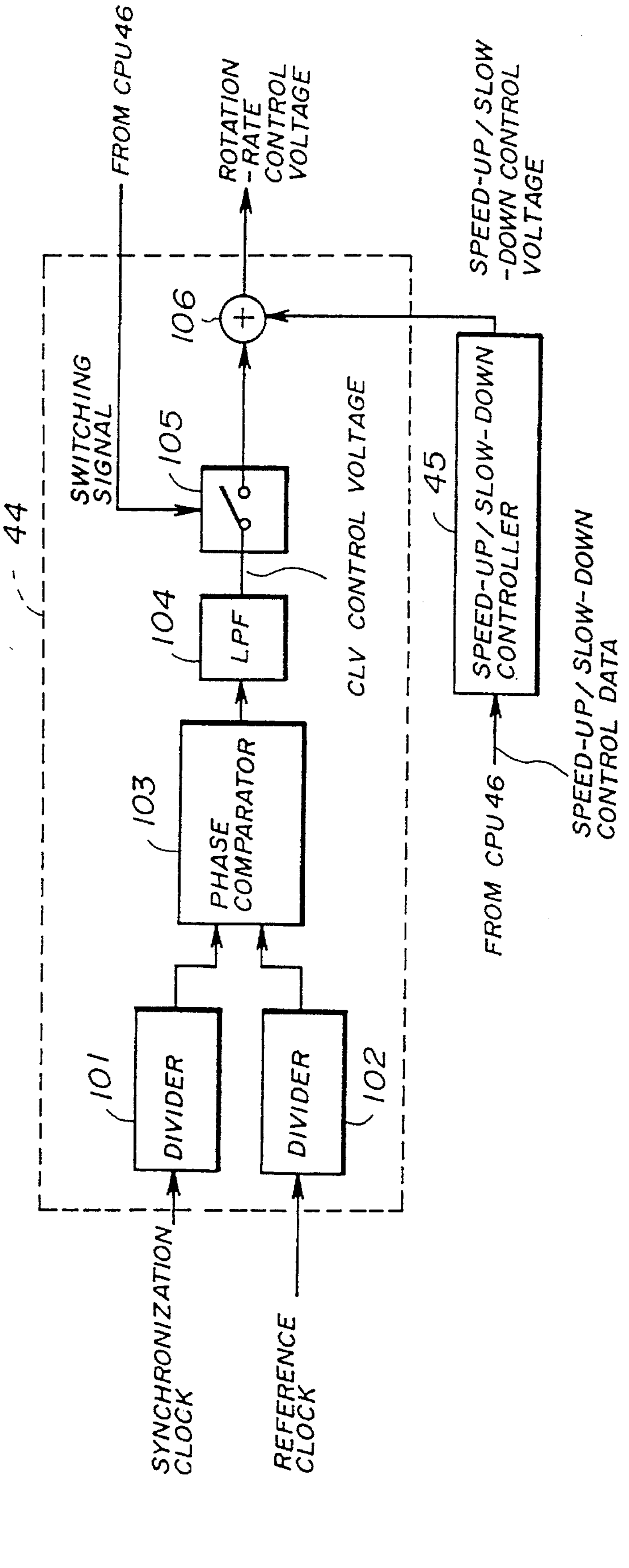
FIG. 5 is a block diagram showing a configuration of a spindle-motor servo circuit of the first embodiment.

FIG. 5 shows a block diagram of a configuration of the spindle-motor servo circuit 44. The spindle-motor servo circuit 44 comprises dividers 101, 102, a phase comparator 103, a low-pass filter 104, a switch 105, and a summation circuit 106.

The dividers 101, 102 divide the synchronization clock and the reference clock respectively to be the signals having the almost same frequency. The divided signals are supplied to the phase comparator 103. The phase comparator 103 compares the phases of the signals coming from the dividers 101, 102 to produce the phase error voltage. The phase error voltage passes through the low-pass filter 104 and the switch 105 and is applied to an input port of the summation circuit 106. The speed-up/slow-down control voltage coming from the speed-up/slow-down controller 45 is applied to the other input of the summation circuit 106. An output voltage of the summation circuit 106 is supplied as the rotation-rate control voltage to the spindle-motor driver 24.

The dividers 101, 102, the phase comparator 103, and the low-pass filter 104 construct the linear-velocity control unit. The CPU 46 and the speed-up/slow-down controller 45 construct the speed-up/slow-down signal generation unit. And the switch 105, the summation circuit 106, and the CPU 46 construct the switching unit.

In the normal reproducing operation, the switch 105 is turned on by the switching signal from the CPU 46, and the speed-up/slow-down control voltage is set to 0 by the speed-up/slow-down control data from the CPU 46. Thus, the CLV control voltage supplied from the low-pass filter 104 is sent as the rotation-rate control voltage to the spindle-motor driver 24. By the CLV control voltage, the rotation-rate of the spindle motor 23 is controlled to maintain the reference linear velocity which is determined by the reference-clock frequency.

When the pickup 26 transits in the seek operation, the switch 105 is turned off by the switching signal from the CPU 46, and the speed-up/slow-down control voltage which is indicated by the speed-up/slow down control data from the CPU 46, is applied to the summation circuit 106. Thus, the speed-up/slow-down control voltage is sent as the rotation-rate control voltage to the spindle-motor driver 24. By the speed-up/slow-down control voltage, the spindle-motor 23 is sped up or slowed down during the transition of the pickup 26.

After the speed-up/slow-down operation, the speed-up/slow-down control voltage is set to 0 V by the speed-up/slow-down control data from the CPU 46. At this time, the spindle motor 23 is controlled to maintain the rotation rate at the rate when the speed-up/slow-down operation finished, by the spindle-motor driver 24 checking the FG pulses. After that, when the PLL circuit 36 is synchronized to the EFM signal, the switch 105 is turned on to be in the CLV control state.

And in the seek operation, the CPU 46 commands the pickup control section 27 to move the pickup 26 to the target track. The CPU 46 may also use an address data supplied from the signal processing circuit during the reproducing operation, for determining the track's position.

Next, a description will be given of an operation of the first embodiment of the CD-ROM reproducing device, by referring to FIG. 6. In the normal reproducing operation or the stand-by mode when waiting for any commands from the external devices, the CPU 46 turns on the switch 105, and supplies the speed-up/slow-down control data to the speed-up/slow-down controller to set the speed-up/slow-down control voltage to 0 V. Thus, during the reproduction operation, the CLV control voltage is supplied as the rotation-rate control voltage to the spindle-motor driver 24, so that the spindle motor 23 is controlled to maintain the reference linear velocity which is determined by the reference clock.

Figure 6:
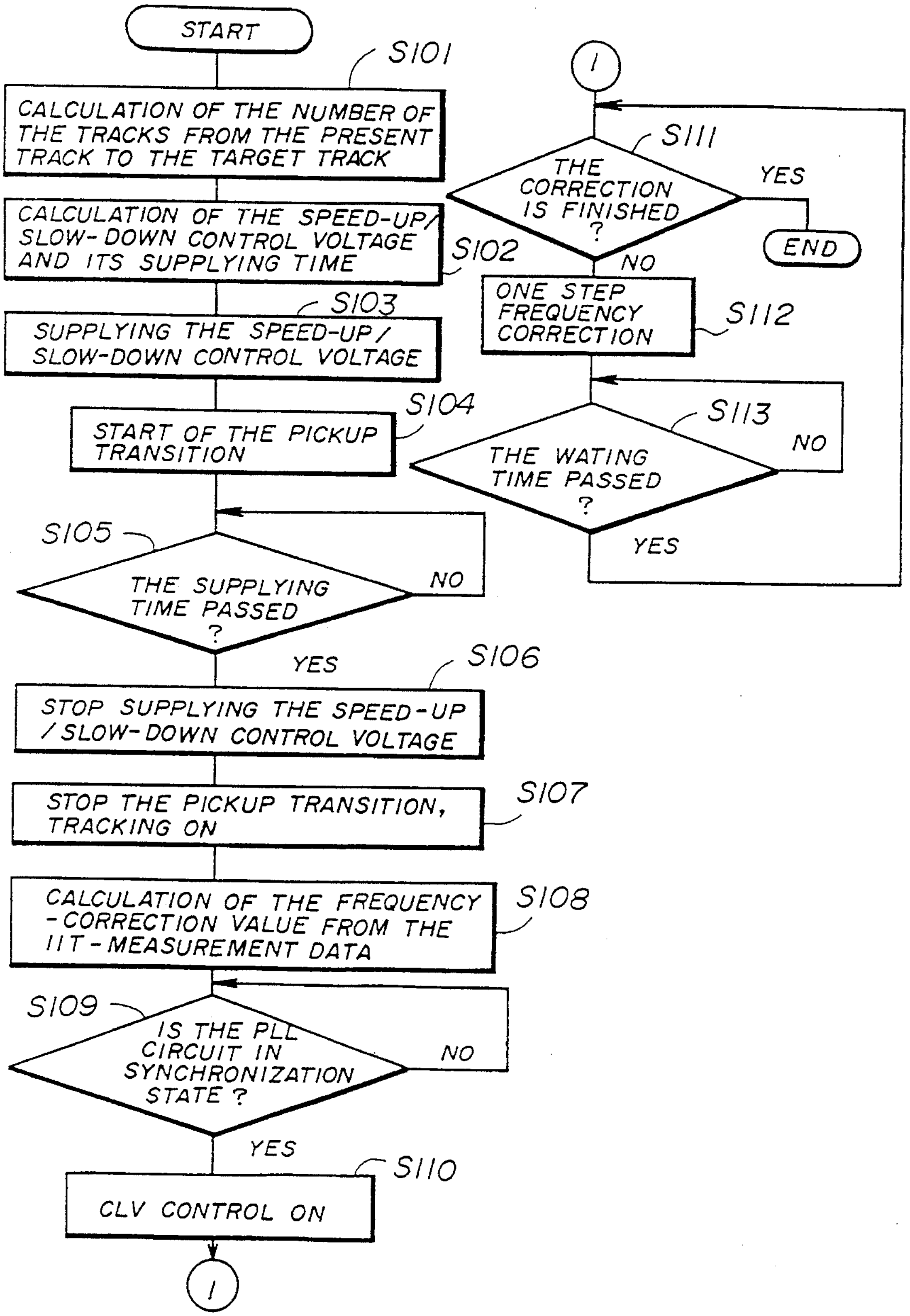
FIG. 6 is a flowchart for explaining an operation procedure of the seek operation of the first embodiment.

FIG. 6 shows a flowchart for explaining procedures of the seek operation. When the CPU 46 receives the commands to seek the target address and to reproduce from the external device, the seek operation starts.

At a step 101, the CPU 46 calculates a number of the tracks from the present address to the target address. At a step 102, by using the calculated number of the tracks, the rotation rate of the spindle motor 23 at the target track is calculated. Furthermore, from the difference between the rotation rate of the spindle motor 23 at the present track and at the target track, the speed-up control voltage or the slow-down control voltage (the speed-up/slow-down control voltage), and its supplying time are calculated.

After that, at a step 103, the CPU 46 turns off the switch 105 of the spindle-motor servo circuit 44, and supplies the speed-up/slow-down control data to the speed-up/slow-down controller 45 which produces the speed-up/slow-down control voltage which is calculated at the step 102. Thus, the CLV control operation is deactivated, but the speed-up/slow-down control voltage is applied to the spindle-motor driver 24 to start the speed-up/slow-down control of the spindle motor 23.

At the same time, at a step 104, the CPU 46 commands the pickup control section 27 to deactivate the tracking servo and to move the pickup 26 to the target address. During the transition of the pickup 26, the speed-up/slow-down control of the spindle motor 23 is performed by the above speed-up/slow-down control voltage. If the pickup 26 moves to the direction of the outside of the disk 21, the spindle motor 23 is controlled to slow-down, while if the pickup 26 moves to the direction of the inside of the disk 21, the spindle motor 23 is controlled to speedup.

At a step 105, the CPU 46 monitors whether the supplying time of the speed-up/slow-down control voltage has passed or not, and if the supplying time has passed, the CPU 46 proceeds to a step 106.

At the step 106, the CPU 46 supplies the speed-up/slow-down control data to the speed-up/slow-down controller 45, so as to set the speed-up/slow-down control voltage to 0 V. Therefore, the rotation-rate control voltage which is supplied to the spindle-motor driver 24 becomes 0 V to stop supplying the speed-up/slow-down control voltage. As has already been stated, by checking the FG pulses, the spindle-motor driver 24 controls the spindle motor 23 to maintain its rotation rate at the time when the speed-up/slow-down control voltage stops being supplied.

At a step 107, after the CPU 46 detects that the transition distance of the pickup 26 has reached the number of the tracks calculated at the step 101, the CPU 46 commands the pickup control section 26 to stop the pickup transition, and activates the tracking servo.

When the tracking servo is activated, the EFM signal is obtained by the digitizing circuit 34. In the 11T-measuring circuit 39, the 11T pulse is measured from the EFM signal, and the 11T-measurement data is supplied to the frequency-setting circuit 40 and the CPU 46.

In the frequency-setting circuit 40, the bit frequency is derived from the 11T-measurement data as the setting bit frequency, and which is set to the free-run frequency of the PLL circuit 36. In this way, the PLL circuit 36 may produce in a short time the synchronization clock which is synchronized to the EFM signal.

At the same time, the frequency-setting circuit 40 supplies the reference-clock control data to the reference-clock generation circuit 41, in which this control data indicates the frequency in proportion to the setting bit frequency derived from the 11T-measurement data. Thereby, the reference-clock generation circuit 41 generates the reference clock in proportion to the setting bit frequency.

In this way, after the transition of the pickup 26, when the EFM signal is generated, the PLL circuit 36 can be phase synchronized to the EFM signal in a extremely short time, and the reference clock can be simultaneously generated at the frequency corresponding to the bit frequency of the EFM signal.

After the synchronization between the PLL circuit 36 and the EFM signal, the signal processing circuit 42 is capable of demodulating the EFM signal and reading out the signal by using the synchronization clock and the reference clock.

The specified linear velocity, namely the specified 11T-pulse data corresponding to the specified bit frequency, is stored in the ROM inside the CPU 46. At a step 108, the CPU 46 derives the difference between the 11T-measurement data and the specified 11T-pulse data, and calculates the difference between the specified bit frequency and the measured bit frequency derived from the 11T-measurement data to produce the frequency-correction value.

At a step 109, by the synchronization indicating signal, the CPU 46 determines whether the PLL circuit 36 is in synchronization to the EFM signal or not. If the CPU 46 detects that the PLL circuit 36 has been in synchronization to the EFM signal, at a step 110, the switch 105 in the spindle-motor servo circuit 44 is turned on. Thus, the CLV voltage which is based on the reference clock is supplied as the rotation-rate control voltage to the spindle-motor driver 24 to activate the CLV control.

As a result of the speed-up/slow-down control of the spindle motor 23, if there is a difference between the controlled rotation rate and the proper rotation rate at the target track, thereby the 11T-measurement data is different from the specified 11T-pulse data, and the reference clock is also deviated from the specified frequency corresponding to the specified linear velocity (i.e. the specified bit frequency) according to the above difference.

As has already been stated, the spindle motor 23 is controlled to maintain a constant linear velocity based on the reference clock derived from the 11T-measurement data at the time when the speed-up/slow-down control voltage stopped being supplied. Therefore, if the 11T-measurement data deviates from the specified 11T-pulse data, the linear velocity which is being maintained also deviates from the specified linear velocity. Sequential procedures of a step 111 to a step 113 are used to correct the linear velocity. Once the command for the frequency correction from the CPU 46 is supplied to the frequency-setting circuit 40, the reference frequency and the free-run frequency are corrected, and thereby the rotation rate of the spindle motor 23 is corrected to get the specified linear velocity.

In these corrections to the reference clock and the free-run frequency, the setting bit frequency, by which the reference clock and the free-run frequency are determined, is corrected by a small degree of one step by the CPU 46.

At the step 111, the total amount of the frequency correction until now at the step 112 is subtracted from the frequency correction value which has been calculated at the step 108, and the rest of the frequency correction value is compared with a defined frequency error. As a result of the comparison, when the rest of the frequency correction value is equal to or less than the defined frequency error, the correction is ceased by the determination that a further correction is unnecessary. At this time, the seek operation is finished. On the other hand, when the rest of the frequency correction value is more than the defined frequency error, the frequency correction at the step 112 is continued.

At the step 112, the CPU 46 supplies the frequency correction command, which increases the bit frequency by only the amount of the correction corresponding to the one step, to the frequency-setting circuit 40. This amount of the correction corresponding to the one step is selected to be a small value such that the PLL circuit 36 and the spindle-motor servo circuit 44 are not out of synchronization.

Once the frequency-setting circuit 40 receives the frequency correction command, this circuit increases the setting bit frequency, which is the base for determining the reference clock and the free-run frequency of the PLL circuit 36, by one step. Thus, the free-run frequency which is indicated by the free-run-frequency control data increases by the amount of the correction of the bit frequency, and the frequency of the reference clock which is indicated by the reference-clock control data increases in proportion to the amount of the correction of the bit frequency.

In the frequency-setting circuit 40, after the transition of the pickup 26, the value of the 11T-measurement data which has been first supplied is stored, and the setting bit frequency which has been derived from the stored 11T-measurement data is corrected by one step whenever receiving the frequency correction command. Therefore, the 11T-measurement data which has been changed by the frequency correction is not utilized.

At the step 112, the total amount of the correction is updated by means that a correct amount of the correction corresponding to one step is added to the previous total amount of the correction.

At the step 113, after the frequency correction corresponding to one step, a given waiting time is set until the tracking of the spindle motor 23 is finished. Once the given waiting time passes, the operation proceeds back to the step 111, and the frequency correction is continued.

Figure 7:
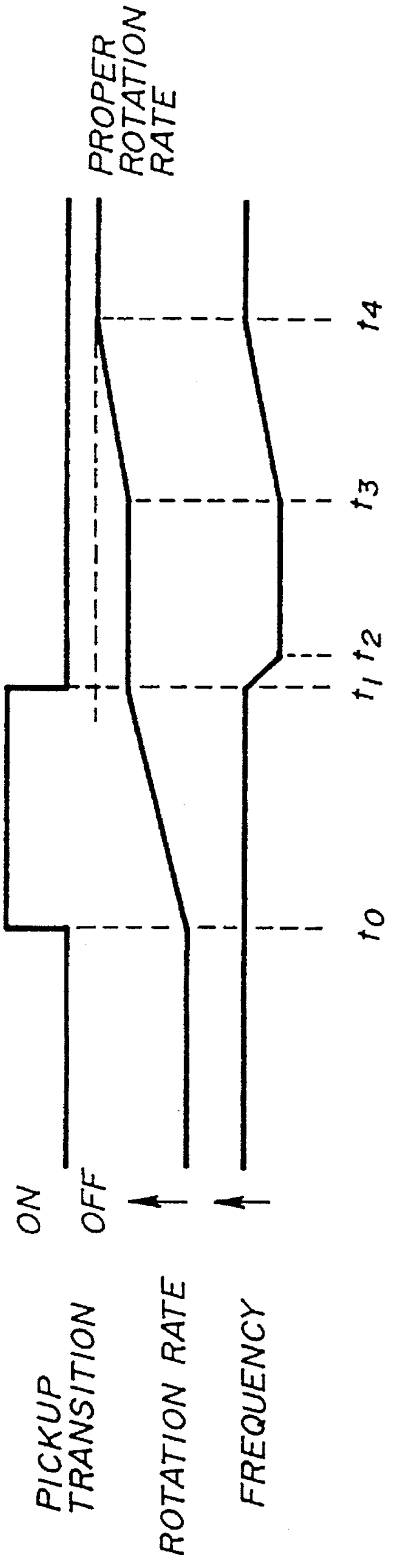
FIG. 7 is time charts for explaining the seek operation of the first embodiment.

FIG. 7 shows timecharts for explaining the seek operation of the CD-ROM reproducing device of this embodiment. "PICKUP TRANSITION" indicates on/off operation of the transition of the pickup 26, "ROTATION RATE" indicates the rotation rate of the spindle motor 23, and "FREQUENCY" indicates the frequency of the synchronization clock generated in the PLL circuit 36.

FIG. 7 shows an example of the seek operation from the outside of the disk 21 to its inside. At time $t_0$, the pickup 26 starts to transit, and the speed-up/slow-down control of the spindle motor 23 simultaneously starts by supplying the speed-up/slow-down control voltage to the motor. At time $t_1$, the speed-up/slow-down control voltage stops being supplied, and the pickup 26 simultaneously stops transiting. Just after the time $t_1$, the EFM signal is generated by the digitizing circuit 34. And sequentially, the 11T measurement data is generated by the 11T-measuring circuit 39, and the bit frequency derived from the EFM signal is set to the free-run frequency of the PLL circuit 36 by the frequency-setting circuit 40. And the reference clock corresponding to the 11T-measurement data is generated by the reference-clock generation circuit 41.

In this way, the PLL circuit 36 can be synchronized to the EFM signal in a extremely short time from $t_1$ to $t_2$. After the time $t_2$, the signal processing circuit 42 is capable of demodulating and reading out the data.

Until the frequency correction by the CPU 46 starts, namely for the period from $t_2$ to $t_3$ (in actuality, this period may be an extremely short time), the spindle motor 23 is controlled to maintain the constant reference linear velocity which is determined based of the reference clock. In FIG. 7, when the pickup 26 stops transiting, the rotation rate of the spindle motor 23 is less than the proper rotation rate, so that for the period from $t_2$ to $t_3$ the reference linear velocity which is less than the specified linear velocity is being maintained.

For the period from $t_3$ to $t_4$, as has already been stated in FIG. 6, the free-run frequency of the PLL circuit 36 and the frequency of the reference clock are corrected by one step in response to the frequency-correction command from the CPU 46. Therefore, the rotation rate of the spindle motor 23 and the frequency of the synchronization clock are corrected. At the time $t_4$, by these corrections, the rotation rate of the spindle motor 23 may reach the proper rotation rate at the target track. In the reproducing operation after that, the spindle motor 23 is controlled to maintain the specified linear velocity by the spindle-motor servo circuit 44.

As mentioned above, in the CD-ROM reproducing device of the first embodiment, just after the transition of the pickup 26, the free-run frequency which is identical to the actual bit frequency is set based on the 11T-measurement data, so that the PLL circuit 36 can be synchronized to the EFM signal in a extremely short time. And this device make it possible to generate the reference clock, which may determine the reference linear velocity of the disk 21, based on the 11T-measurement data in a extremely short time.

The above reasons make it possible to begin the reproducing operation of the data in a extremely short time after the transition of the pickup 26, so that a very short seek time may be achieved compared with that of the conventional device.

And, the data is reproduced by the CLV control, so this device is capable a data transmission rate the same as that of the conventional CD-ROM reproducing device with the CLV system.

Furthermore, in this device, based on the 11T-measurement data and the specified 11T-pulse data, the free-run frequency and the frequency of the reference clock are corrected in response to the frequency correction command from the CPU 46. Therefore, it is possible to correct the linear velocity to the specified linear velocity during data reproduction. The above makes it possible to change the data transmission rate to the specified data transmission rate.

And, based on the frequency correction value which is obtained from the 11T-measurement data and the specified 11T-pulse data, once the calculation procedure of the speed-up/slow-down control voltage and the supplying time of this control voltage are corrected, these corrections make it possible to further reduce the degree that the rotation rate of the spindle motor 23 at the finished time of the pickup transition is different from the proper rotation rate. This optimization of the speed-up/slow-down control enables further reduction of the seek operation time.

In regard to the corrections of the calculation procedure of the speed-up/slow-down control voltage and the supplying time of this control voltage, if, just after installing the disk 21 into the CD-ROM reproducing device, at the time of reading out the TOC part of the disk 21, the above corrections are sequentially carried out, it may be possible to finish the optimization of the speed-up/slow-down control before the actual access.

Furthermore, if, by the command from the CPU 46 to the frequency-setting circuit 40, the frequency which is indicated by the free-run-frequency control data and the frequency which is indicated by the reference-clock control data are respectively fixed to a respective defined frequency, the above enables this device to be used for reproducing an audio CD (CD-DA).

Figure 8:
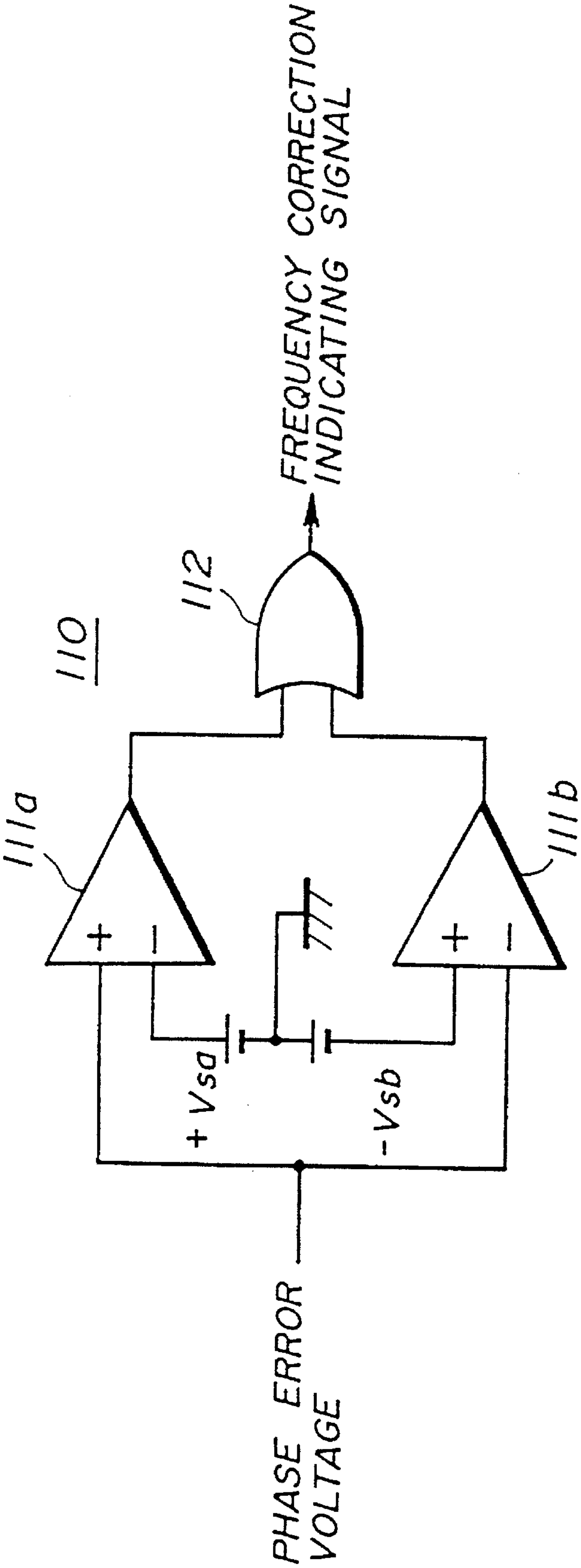
FIG. 8 is a block diagram showing a configuration of a frequency-correction indicating circuit in a second embodiment according to the present invention.

FIG. 8 shows a schematic diagram of a frequency-correction indicating circuit 110 being installed in the CD-ROM reproducing device of a second embodiment according to the present invention. The second embodiment has the same configuration as the first embodiment except the frequency-correction indicating circuit 110 and the frequency-correction procedure.

The frequency-correction indicating circuit 110 comprises a threshold voltage +Vsa, a comparator 111*a* for comparing the phase error voltage which is generated from the phase comparator 103 of the spindle-motor servo circuit 44 with the threshold voltage +Vsa, a threshold voltage −Vsb, a comparator 111*b* for comparing the above phase error voltage with the threshold voltage −Vsb, and an OR gate 112 for logically summing the output signals of comparators 111*a*, 111*b*.

The comparator 111*a* produces a high level signal when the phase error voltage is larger than the threshold voltage +Vsa, while the comparator 111*a* produces a low level signal when the phase error voltage is equal to or smaller than the threshold voltage +Vsa. On the other hand, the comparator 111*b* produces a high level signal when the phase error voltage is a negative voltage which is less than the threshold voltage −Vsb, while the comparator 111*b* produces a low level signal when the phase error voltage is equal to or larger than the threshold voltage −Vsb.

The OR gate 112 produces the logical summation of the outputs of the comparators 111*a*, 111*b*, as the frequency-correction indicating signal. For example, if the phase error voltage is equal to or less than the threshold voltage +Vsa, and is equal to or larger than the threshold voltage −Vsb, the frequency-correction indicating signal is to be a low level. This frequency-correction signal is supplied to the CPU 46.

In this second embodiment, in the frequency correction process at the steps 111 to 113 of the seek operation of the first embodiment in FIG. 6, the CPU 46 supervises the frequency-correction indicating signal after the frequency correction by one step, and proceeds to the next frequency correction by one step due to the frequency-correction indicating signal falling down to the low level.

The thresholds +Vsa, −Vsb are set so that when the frequency difference between the synchronization clock frequency (the current bit frequency of the EFM signal) and the corrected bit frequency (corresponding to the frequency of the reference clock) is, even if the frequency correction by one step is sequentially carried out, the value such that the PLL circuit 36 and the spindle-motor servo circuit 44 are not out of synchronization, the frequency-correction indicating signal could be at a low level.

In the second embodiment, compared with the first embodiment that the given waiting time is set every time the frequency correction by one step is carried out, it is possible to perform the frequency correction in a further short time.

As described above, the present inventions have the following features.

After the transition of the optical pickup, the PLL circuit can be synchronized to the reproduced digital signal in a extremely short time. And the reference clock for reading out the data can be generated in a extremely short time based on the measured-bit-frequency information, and the above makes it possible to reproduce the data in a extremely short time after the transition of the optical pickup, so that the seek operation time is reduced compared to the conventional device.

And the data is reproduced with the constant linear velocity, therefore it is possible to get the same data transmission rate as that of the conventional reproducing device with the CLV system.

Furthermore, based on the measured-bit-frequency information and the specified-bit-frequency information, the free-run frequency of the PLL circuit and the frequency of the reference clock are corrected, so that these corrections enable the linear velocity of the disk to be corrected to the specified linear velocity, and thus the data transmission rate can be adjusted to the specified data transmission rate.

In addition, without extending the acquisition frequency range of the PLL circuit, and without extending the phase-error range for the operation of the linear-velocity control unit, it is possible to normally correct the linear velocity of the optical disk to the specified linear velocity.

Further, the present invention is not limited to these embodiments, but various variations and modifications may be made without departing from the scope of the present invention.

What is claimed is:

1. An optical disk device generating reproduced data based on a reproduced digital signal which is derived by tracking a track on an optical disk with an optical pickup, the device comprising:

bit-frequency-information generation means for measuring a bit frequency of said reproduced digital signal after transition of said optical pickup in a seek operation, and for generating measured-bit-frequency information which indicates a measured bit frequency measured thereby;

bit-frequency setting means for correcting, if there is a difference between said measured bit frequency and a specified bit frequency, said measured-bit-frequency information so as to adjust the bit frequency of said reproduced digital signal to the specified bit frequency by a given amount of correction, and producing a corrected measured bit frequency as setting-bit-frequency information; and a PLL circuit for generating a synchronization clock which is phase synchronized to said reproduced digital signal and is used for generation of said reproduced data by means of setting the bit frequency indicated by said setting-bit-frequency information to a free-run frequency of the PLL circuit.

2. The optical disk device as claimed in claim 1, further comprising:

disk driving means for rotating said optical disk based on a rotation control signal;

speed-up/slow-down signal generation means for generating a speed-up/slow-down signal which is supplied to said disk driving means during transition of the optical pickup in said seek operation and is used to adjust a rotation rate of said optical disk to a target rotation rate;

reference-clock generation means for generating a reference clock, a frequency of which is in proportion to said bit frequency indicated by said setting-bit-frequency information, and in which the reference clock is used for reproducing the data from said reproduced digital signal; and linear-velocity control means for supplying a result of comparison of said synchronization clock with said reference clock as a linear-velocity control signal to said disk driving means instead of said speed-up/slow-down signal, and in which the linear-velocity control signal controls the rotation rate of the disk to keep a linear velocity defined by said reference clock.

3. The optical disk device as claimed in claim 2, wherein said bit-frequency setting means generates the setting-bit-frequency information by means of correcting the setting-bit-frequency information by a given amount of correction, which is determined by taking account of a tracking time of the rotation rate of the optical disk, and also is determined so that said PLL circuit will not be out of synchronization with said reproduced digital signal, and so that said linear-velocity control means will generate said linear-velocity control signal compared with said synchronization clock.

4. A seek operation method for moving an optical pickup to a target track of a disk and reproducing data on an optical disk device, comprising the steps of:

(a) moving said optical pickup to the target track, and during transition of the optical pickup in said seek operation, supplying a speed-up/slow-down signal to disk driving means to adjust a rotation rate of the disk to a target rotation rate;

(b) measuring a bit frequency of a reproduced digital signal which is reproduced from said disk with the optical pickup, after the adjustment of the rotation rate by said speed-up/slow-down signal;

(c) setting the measured bit frequency to a free-run frequency of a PLL circuit, and generating in a short time a synchronization clock which is synchronized to said reproduced digital signal based on the free-run frequency;

(d) supplying measured bit frequency information to a reference-clock generation means, and generating a reference clock which is used for reproducing the data from said reproduced digital signal;

(e) supplying a result of comparison of said synchronization clock with said reference clock as a linear-velocity control signal to said disk driving means instead of said speed-up/slow-down signal just after the synchronization of said PLL circuit, and controlling the rotation rate of the disk to keep a linear velocity defined by said reference clock;

(f) reproducing the data based on said reference clock;

(g) correcting said measured bit frequency by a given amount of correction so as to adjust the bit frequency of said reproduced digital signal to a specified bit frequency if there is a difference between said measured bit frequency and the specified bit frequency, and producing the corrected measured bit frequency as a correcting bit frequency information; and (h) correcting the free-run frequency of said PLL circuit and the reference clock of said reference-clock generation means according to said correcting bit frequency information;

wherein the step (g) and the step (h) are repeated until a difference between said correcting bit frequency and said specified bit frequency is less than a given value.

* * * * *